United States Patent
Hwang et al.

(10) Patent No.: US 9,342,736 B2
(45) Date of Patent: May 17, 2016

(54) ELECTRONIC DEVICE HAVING SENSOR UNIT AND OPERATING METHOD THEREOF

(71) Applicant: Samsung Electronics Co., Ltd., Gyeonggi-do (KR)

(72) Inventors: Sang-Min Hwang, Gyeonggi-do (KR); Jeong-Ho Cho, Gyeonggi-do (KR); Dong-Han Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 14/227,504

(22) Filed: Mar. 27, 2014

(65) Prior Publication Data
US 2015/0062594 A1  Mar. 5, 2015

(30) Foreign Application Priority Data
Aug. 27, 2013 (KR) .................. 10-2013-0101610

(51) Int. Cl.
*G01N 21/00* (2006.01)
*G06K 9/00* (2006.01)
*G06F 3/0488* (2013.01)
*G06K 9/20* (2006.01)
*G06K 9/22* (2006.01)

(52) U.S. Cl.
CPC ........ *G06K 9/00335* (2013.01); *G06F 3/04883* (2013.01); *G06K 9/2018* (2013.01); *G06K 9/228* (2013.01)

(58) Field of Classification Search
CPC ...... G01B 11/002; G01B 11/14; G01B 11/24; G01B 11/026; G01B 5/20; G06F 3/042; G06F 3/0428; G06F 3/011; G06F 3/017; G01S 15/42; G01S 15/50
USPC .......... 356/614–623; 345/156–160, 173–175; 250/559.2, 559.4, 221, 222.1
See application file for complete search history.

(56) References Cited

U.S. PATENT DOCUMENTS

| | | | |
|---|---|---|---|
| 6,552,810 B1 * | 4/2003 | Hermann | G01D 5/36 250/237 G |
| 6,875,993 B2 * | 4/2005 | Tatum et al. | 250/559.2 |
| 8,822,903 B2 * | 9/2014 | Phan Le | G01S 7/4811 250/208.4 |
| 2001/0007449 A1 * | 7/2001 | Kobachi | G01S 7/4811 345/156 |
| 2005/0041237 A1 * | 2/2005 | Richter et al. | 356/71 |
| 2011/0019205 A1 * | 1/2011 | Gerber et al. | 356/615 |
| 2011/0168877 A1 * | 7/2011 | Hsu | H04L 12/6418 250/221 |
| 2011/0248961 A1 * | 10/2011 | Svajda | G01S 3/7803 345/175 |
| 2011/0261300 A1 * | 10/2011 | Miyazaki et al. | 349/104 |
| 2011/0286009 A1 * | 11/2011 | Lohmann | 356/614 |
| 2012/0133955 A1 * | 5/2012 | Baxter | 356/614 |
| 2012/0170056 A1 * | 7/2012 | Jakobsen et al. | 356/614 |
| 2012/0250033 A1 * | 10/2012 | Kitagawa et al. | 356/614 |
| 2014/0306099 A1 * | 10/2014 | Oguchi | G01D 5/3473 250/225 |
| 2015/0261338 A1 * | 9/2015 | Shimizu | H01L 31/02327 345/175 |

FOREIGN PATENT DOCUMENTS

KR   20110107764   10/2011
WO   WO 2013/065737 A1 *   5/2013

* cited by examiner

*Primary Examiner* — Hoa Pham
(74) *Attorney, Agent, or Firm* — The Farrell Law Firm, P.C.

(57) ABSTRACT

A method for operating an electronic device including a sensor unit that uses infrared rays is provided. In the method, a light source is illuminated using at least one light emitting device. Whether the illuminated light source is received by a light receiving device including at least one light receiving channel is determined. A relevant function corresponding to an amount of light of the light source received by the at least one light receiving channel is performed.

16 Claims, 12 Drawing Sheets

ELECTRONIC DEVICE HAVING SENSOR UNIT AND OPERATING METHOD THEREOF

PRIORITY

This application claims priority under 35 U.S.C. §119(a) to a Korean Patent Application filed in the Korean Intellectual Property Office on Aug. 27, 2013 and assigned Serial No. 10-2013-0101610, the entire disclosure of which is incorporated herein by reference.

BACKGROUND OF THE INVENTION

1. Field of the Invention

The present invention generally relates to an electronic device having a sensor unit and an operating method thereof.

2. Description of the Related Art

Recently, as multimedia technology develops, electronic devices are now provided with various functions. Generally, these electronic devices have a convergence function of performing one or more complex functions.

Furthermore, for electronic devices, mobile terminals roughly classified as so-called "smartphone" are now mainstream. Particularly, these mobile terminals have a large screen touch type display module, and have a mega pixel camera module, in addition to a basic function of communication with a counterpart user, to enable still picture and moving picture taking. Also, the mobile terminals may reproduce multimedia contents such as music, moving pictures, etc., and can access a network to perform web surfing. These mobile terminals perform various convergence functions faster by having a high performance processor, and continue make remarkable developments whereby the primary function of communication with a counterpart user is now considered to be an additional function, rather than the primary function. Also, to increase the usability and convenience of the electronic devices, these electronic devices are provided with various sensors such as an illuminance sensor, a proximity sensor, a Hall sensor, etc.

SUMMARY OF THE INVENTION

An aspect of the present invention is to address at least the above-mentioned problems and/or disadvantages and to provide at least the advantages described below. Accordingly, an aspect of the present invention is to provide an electronic device having a sensor unit that uses infrared and an operating method thereof.

Another aspect of the present invention is to provide an electronic device having a sensor unit capable of implementing a proximity sensor and a gesture sensor simultaneously, and an operating method thereof.

Still another aspect of the present invention is to provide an electronic device for providing an intuitive user interface via a sensor unit that uses infrared, and an operating method thereof.

In accordance with an aspect of the present invention, a method for operating an electronic device including a sensor unit that uses infrared is provided. The method includes illuminating a light source using at least one light emitting device, determining whether the illuminated light source is received by a light receiving device including at least one light receiving channel, and performing a relevant function corresponding to an amount of light of the light source received by the at least one light receiving channel.

In accordance with another aspect of the present invention, an electronic device including a sensor unit that uses infrared is provided. The electronic device includes a light emitting device, a light receiving device disposed at a position adjacent to the light emitting device and including at least one light receiving channel, and a processor for determining an amount of a light source received by the at least one light receiving channel depending on reflection of light of an object, and performing a relevant function corresponding to the determined amount of the light source.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustration purposes only and not for the purpose of limiting the invention as defined by the appended claims and their equivalents.

Though an electronic device to which a touchscreen may be applied as a display unit is illustrated herein and describes embodiments of the present invention, it is not limited thereto. For example, as an electronic device, various devices including a touchscreen, such as a Personal Digital Assistant (PDA), a laptop computer, a mobile phone, a smartphone, a net book, a Television (TV), a Mobile Internet Device (MID), a Ultra Mobile Personal Computer (UMPC), a tablet PC, a wrist watch, a camera unit, a navigation device, an MP3 player, etc. may be applicable.

Figure 1:
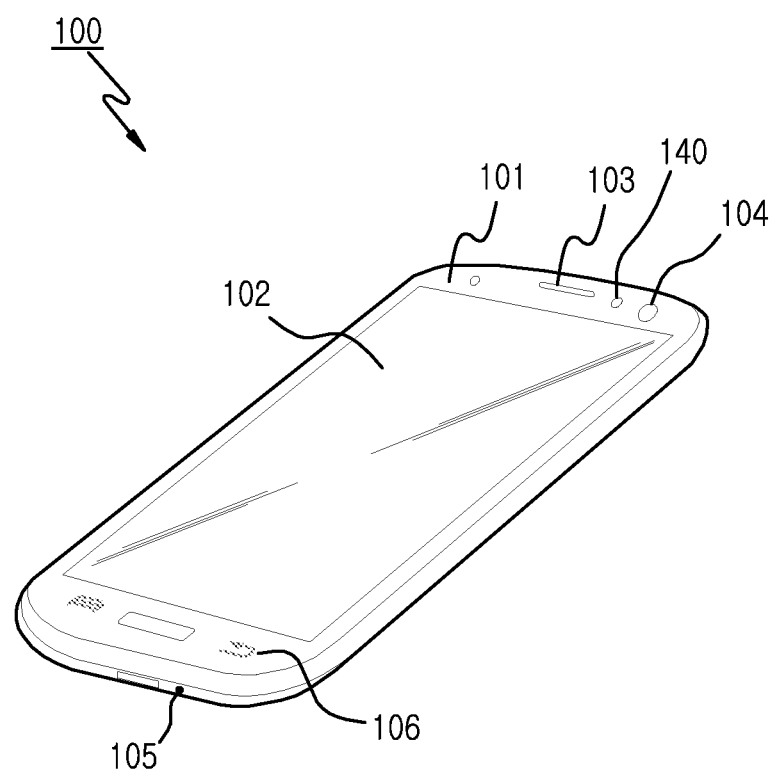
FIG. 1 is a perspective view illustrating an electronic device according to an embodiment of the present invention.

FIG. 1 is a perspective view illustrating an electronic device 100 according to an embodiment of the present invention.

Referring to FIG. 1, a touchscreen 102 as a display module is installed on the front side 101 of the electronic device 100. The touchscreen 102 displays electric signals transferred from the electronic device 100 in the form of text, graphics, an image such as video, etc. The touchscreen 102 may apply a touch sensor to receive data using an input unit such as a finger or a stylus. However, it is not limited thereto, and various display units besides the touchscreen 102 are applicable as the display module.

According to an embodiment, an ear piece 103 for outputting a voice is installed on the upper portion of the touchscreen 102, and a sensor unit 140 for detecting movement and proximity of an object is installed near the ear piece 103. As described below, the sensor unit 140 includes at least one light emitting device and at least one light receiving device, and detects movement and proximity of an object via an amount of light reflected by the object in the neighborhood of the sensor unit 140 using infrared.

The sensor unit 140 operates in a proximity mode for detecting an object approaching the electronic device 100, and a gesture mode for detecting movement of an object separated from the electronic device 100 by a predetermined distance. Also, the sensor unit 140 may operate in a simultaneous mode that activates the proximity mode and the gesture mode simultaneously.

Though the sensor unit 140 is shown in FIG. 1 to be disposed on the front side 101 of the electronic device 100, it is not limited thereto and may be installed on the lateral side or the backside of the electronic device 100.

The electronic device 100 further includes a camera unit 104 for taking a picture of an object, a microphone unit 105 positioned in the lower portion of the touchscreen and receiving sounds, and a keypad unit 106 where input buttons are disposed. However, it is not limited thereto and the electronic device 100 may further install various additional devices for implementing other known additional functions thereon.

Figure 2A:
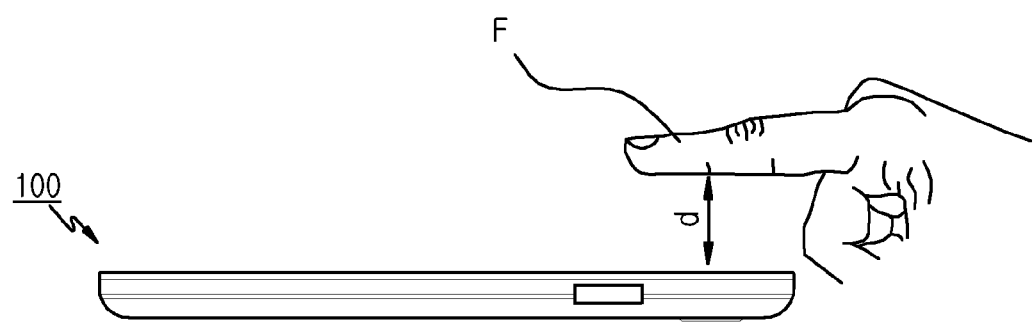
FIGS. 2A and 2B are views illustrating an operating method in a proximity mode of a sensor unit according to an embodiment of the present invention.
Figure 2B:
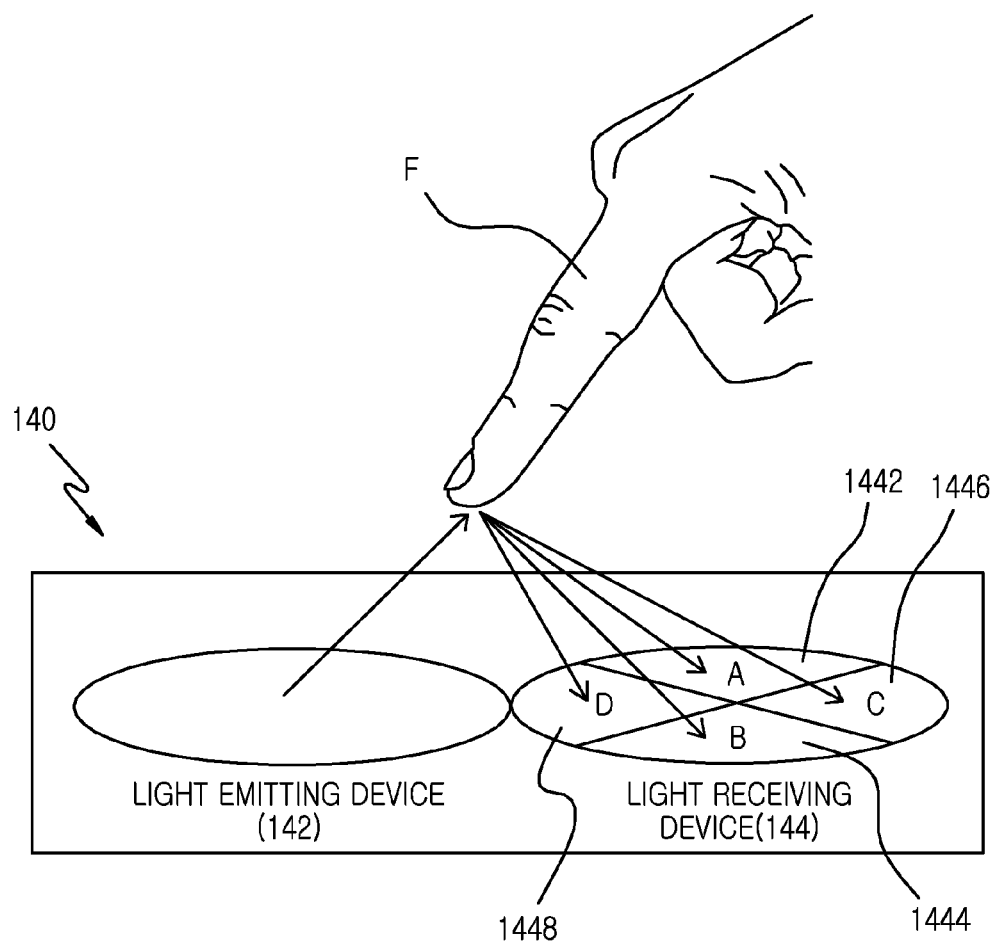

FIGS. 2A and 2B are views illustrating an operating method in a proximity mode of a sensor unit 140 according to an embodiment of the present invention.

Referring to FIGS. 2A and 2B, the sensor unit 140 includes at least one light emitting device 142 and at least one light receiving device 144. The light emitting device 142 may generate infrared rays, and emit a beam in the front direction. The light receiving device 144 may receive a light source reflected by an object among the infrared rays emitted from the light emitting device 142.

According to an embodiment, when operating in the proximity mode, the sensor unit 140 detects an object F approaching the electronic device 100. The sensor unit 140 detects the object F approaching within a threshold distance d from the electronic device 100 via an amount of infrared rays reflected by the object F. For example, the sensor unit 140 operates to recognize proximity of the object F when an amount of infrared rays reflected by the object F is greater than or equal to a reference amount.

The light receiving device 144 includes a plurality of channels 1442, 1444, 1446, 1448 for receiving a light source. The plurality of channels 1442, 1444, 1446, 1448 may be disposed at predetermined intervals or in a specific region.

The sensor unit 140 receives a light source reflected by the object F via the plurality of channels 1442, 1444, 1446, 1448 to measure a sum of received amounts of light while in the proximity mode. According to another embodiment, the sensor unit 140 may control only a specific channel (for example, a channel D 1448) to receive the light source reflected by the object F while in the proximity mode.

The sensor unit 140 may be allowed to receive a light source for detecting the approaching object F via only a channel C 1446 while the proximity mode. In this case, the channel C 1446 of the light receiving device 144 receives the light source at a position separated by the greatest distance from the light emitting device 142 to reduce sensitivity (amount of change) of the received light source.

While the light receiving device 144 of the sensor unit 140 is shown with four channels, it is not limited thereto. For example, the light receiving device 144 may consist of a number of channels much greater than the four channels.

Figure 3A:
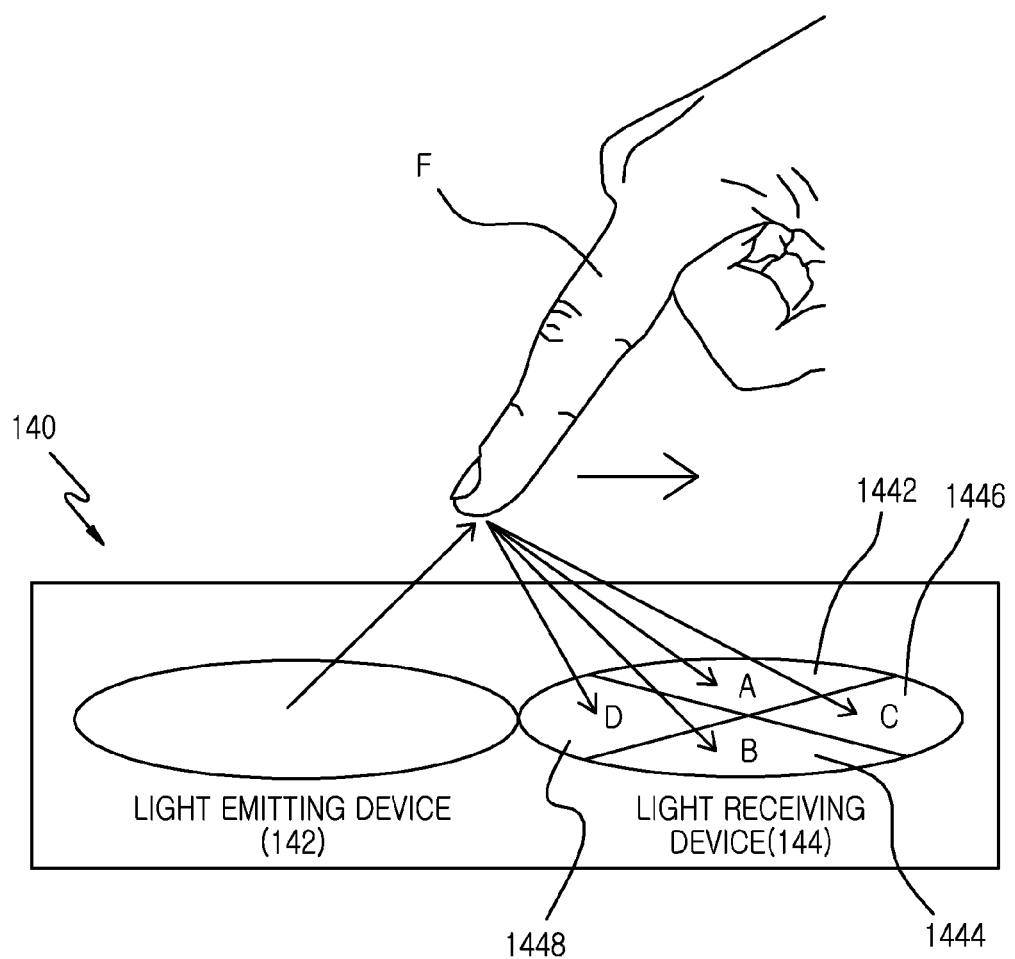
FIGS. 3A and 3B are views illustrating an operating method in a gesture mode of a sensor unit according to an embodiment of the present invention.
Figure 3B:
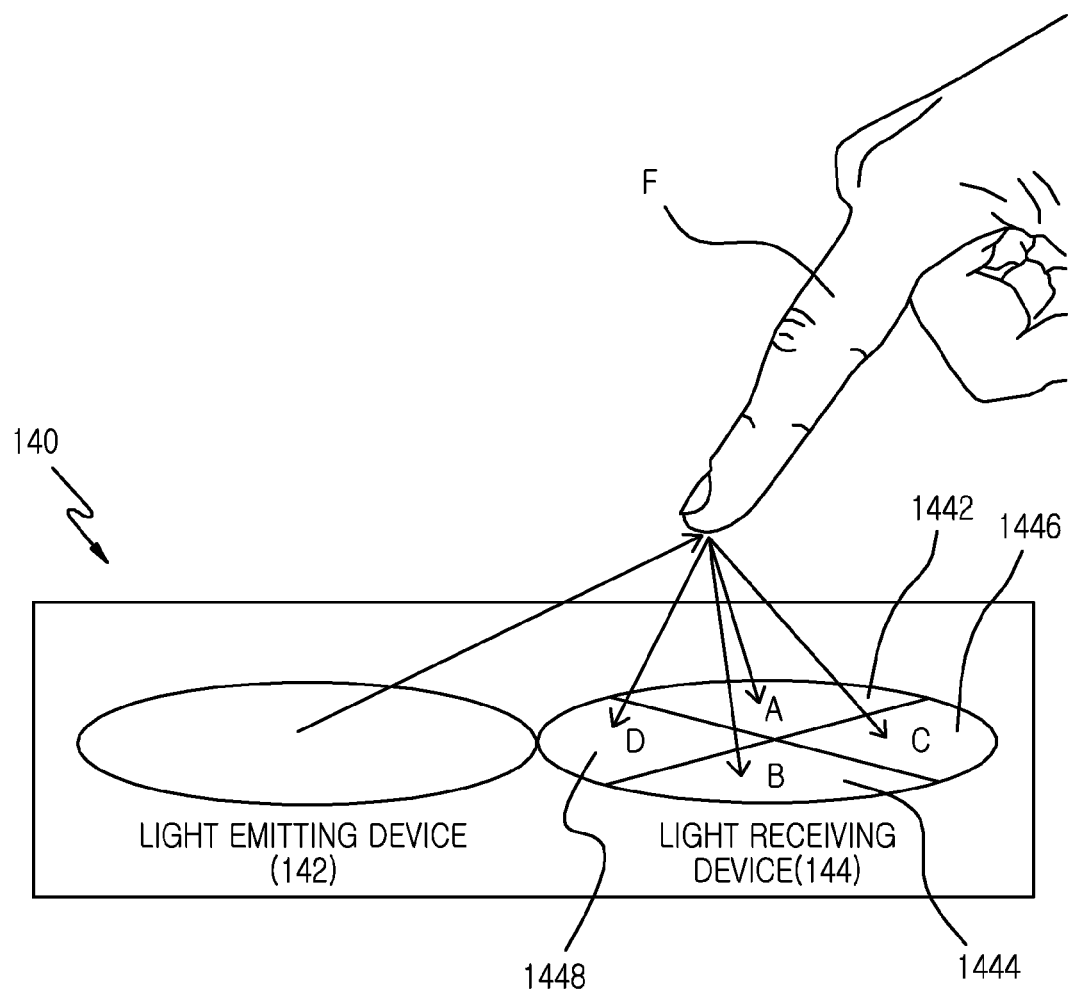

FIGS. 3A and 3B are views illustrating an operating method in a gesture mode of a sensor unit 140 according to an embodiment of the present invention.

Referring to FIGS. 3A and 3B, the sensor unit 140 includes at least one light emitting device 142 and at least one light receiving device 144. The light emitting device 142 generates infrared rays, and emits a beam in the front direction. The light receiving device 144 receives a light source reflected by an object among the infrared rays emitted from the light emitting device 142.

The light receiving device 144 includes a plurality of channels 1442, 1444, 1446, 1448 for receiving a light source. The plurality of channels 1442, 1444, 1446, 1448 may be disposed at predetermined intervals or in a specific region.

According to an embodiment, when operating in the gesture mode, the sensor unit 140 detects movement of an object F separated from the electronic device 100 by a predetermined distance. The sensor unit 140 detects movement of the object F via an amount of light reflected by the object F depending on the movement of the object F. For example, where the object F of FIG. 3A moves to the right as in FIG. 3B, an amount of light reflected by the object F changes in real-time. Specifically, where the object F moves only to the right, a difference value in an amount of light received by a channel A 1442 and a channel B 1444 before the object F moves, and a difference value in an amount of light received by the channel A 1442 and the channel B 1444 after the object F moves will be zero. In contrast, a difference value in an amount of light received by a channel C 1446 and a channel D 1448 before the object F moves, and a difference value in an amount of light received by the channel C 1446 and the channel D 1448 after the object F moves will show a difference of a predetermined value. The sensor unit 140 estimates that the object F moves to the right via this predetermined value. In this manner, the sensor unit 140 may detect the up, down, left, and right movement of the object F via a difference value in an amount of light reflected by the object F depending on the movement of the object F during the gesture mode.

Figure 4A:
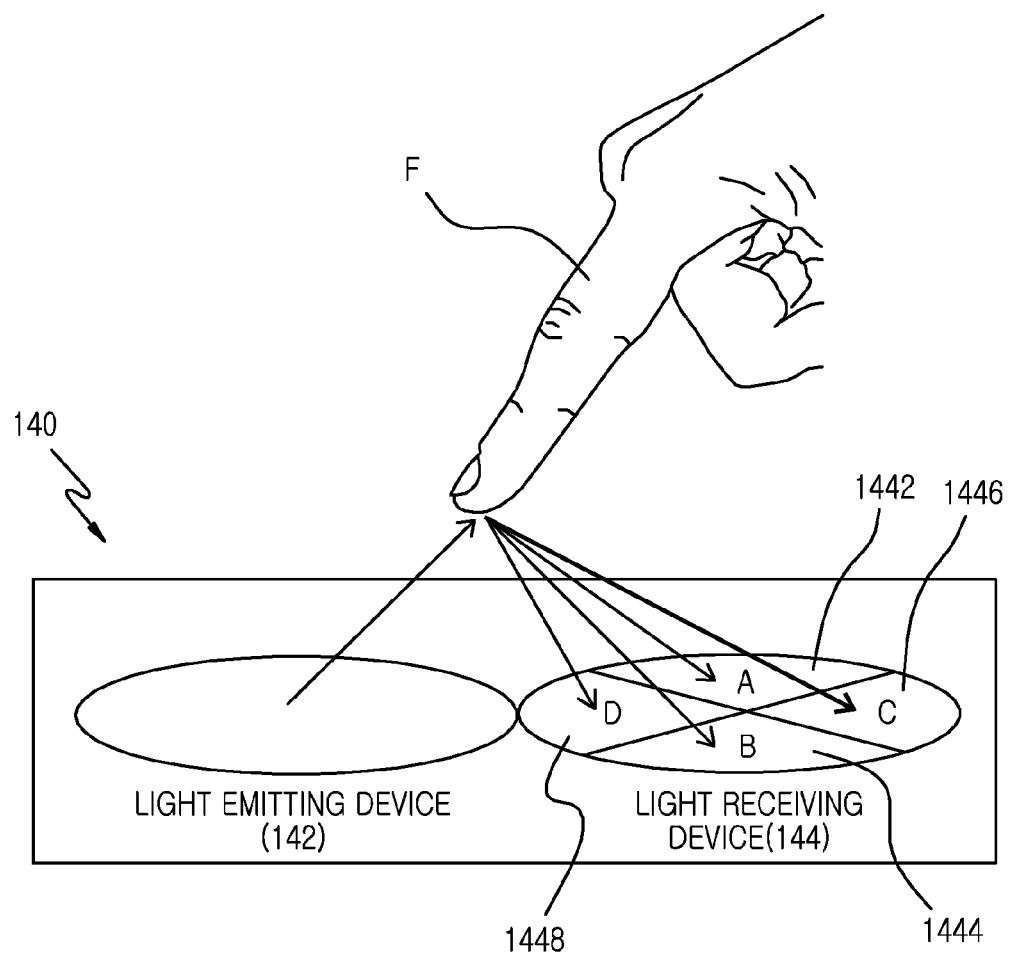
FIG. 4A is a view illustrating an operating method in a simultaneous mode of a sensor unit according to an embodiment of the present invention.

FIG. 4A is a view illustrating an operating method in a simultaneous mode of a sensor unit 140 according to an embodiment of the present invention.

Referring to FIG. 4A, the sensor unit 140 operates in a simultaneous mode that simultaneously activates the proximity mode for detecting an object F approaching the electronic device 100, and the gesture mode for detecting movement of the object F separated from the electronic device 100 by a predetermined distance.

According to an embodiment, when operating in the simultaneous mode, the sensor unit 140 detects movement of the object F separated from the electronic device 100 by a predetermined distance, and simultaneously detects proximity of the object F. For example, the sensor unit 140 may detect movement of the object F using the method described in FIGS. 3A and 3B, and control to further receive a light source for detecting proximity of the object F, reflected by the object F via a specific channel (for example, a channel C 1446). The electronic device 100 may set the channel C 1446 disposed at a position separated the greatest distance from the light emitting device 142 as a channel for detecting proximity of the object F among the plurality of channels 1442, 1444, 1446, 1448 of the light receiving device 144 during the simultaneous mode. Therefore, the channel C 1446 of the light receiving device 144 receives a light source at a position separated the greatest distance from the light emitting device 142 to reduce sensitivity (amount of change) of the received light source. The channel C 1446 may determine whether the object F approaches or not to generate a software signal.

That is, the sensor unit 140 may receive a signal indicating movement of the object F to provide movement information to the electronic device 100, and further receive a signal for detecting proximity of the object F to provide proximity information to the electronic device 100. The sensor unit 140 may be controlled by a processor of the electronic device 100.

Figure 4B:
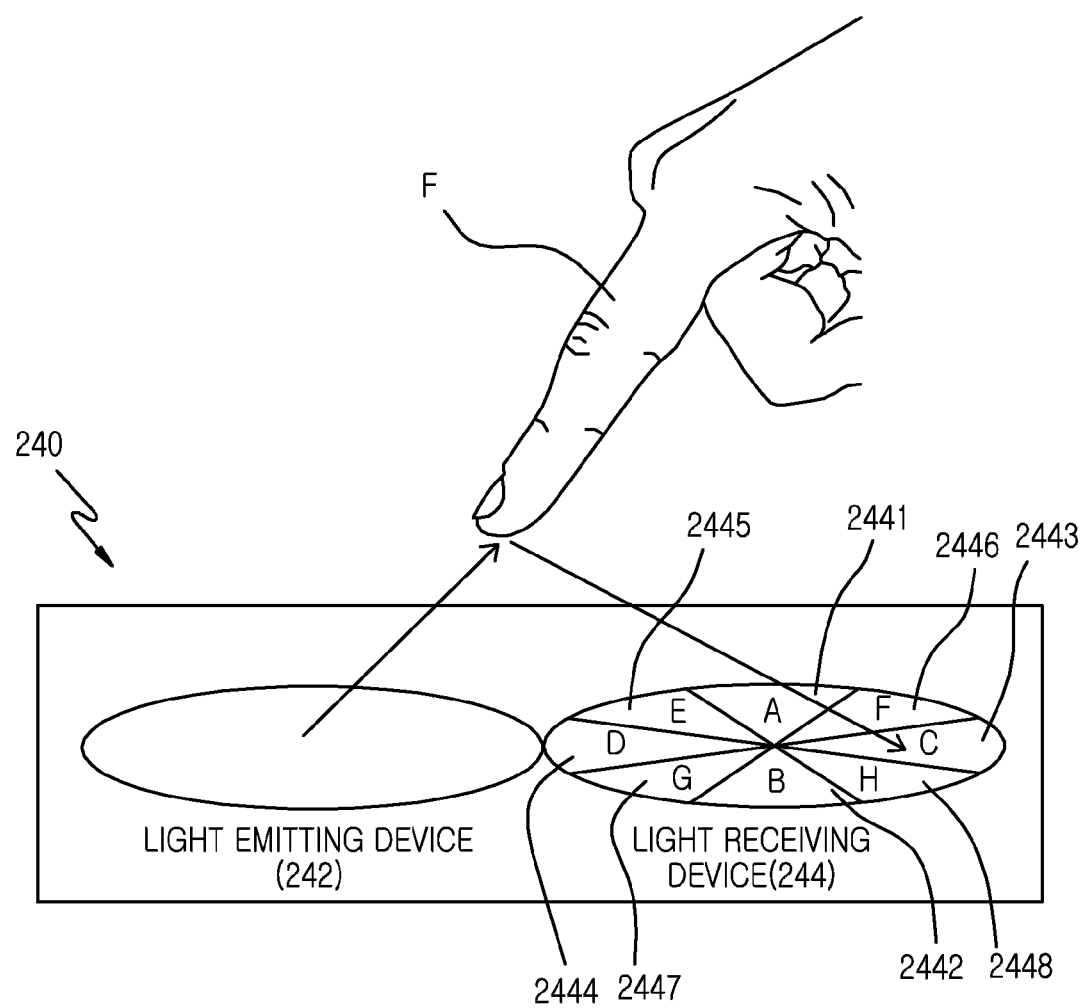
FIG. 4B is a view illustrating an operating method in a simultaneous mode of a sensor unit according to another embodiment of the present invention.

FIG. 4B is a view illustrating an operating method in a simultaneous mode of a sensor unit 240 according to another embodiment of the present invention.

Referring to FIG. 4B, the sensor unit 240 operates in the simultaneous mode that simultaneously activates the proximity mode for detecting an object F approaching the electronic device 100, and the gesture mode for detecting movement of the object F separated from the electronic device 100 by a predetermined distance.

According to an embodiment, the sensor unit 240 includes at least one light emitting device 242 and at least one light receiving device 244. The light emitting device 242 generates infrared rays, and emits a beam in the front direction. The light receiving device 244 receives a light source reflected by the object F among the infrared rays emitted from the light emitting device 242. The light receiving device 244 includes a plurality of channels 2441, 2442, 2443, 2444, 2445, 2446, 2447, 2448 for receiving a light source. The plurality of channels 2441, 2442, 2443, 2444, 2445, 2446, 2447, 2448 may be disposed at predetermined intervals or in a specific region.

When operating in the simultaneous mode, the sensor unit 240 detects movement of the object F separated from the electronic device 100 by a predetermined distance, and simultaneously detects proximity of the object F. For example, the sensor unit 240 may detect movement of the object F using the method described in FIGS. 3A and 3B, and control to further receive a light source for detecting proximity of the object F, reflected by the object F via a specific channel (for example, a channel C 2443). The electronic device 100 may set the channel C 2443 disposed at a position separated the greatest distance from the light emitting device 242 as a channel for detecting proximity of the object F among the plurality of channels 2441, 2442, 2443, 2444, 2445, 2446, 2447, 2448 of the light receiving device 244 during the simultaneous mode. Therefore, the channel C 2443 of the light receiving device 244 may receive a light source at a position separated the greatest distance from the light emitting device 242 to reduce sensitivity (amount of change) of the received light source. The channel C 2443 may determine whether the object F approaches or not to generate a signal.

That is, the sensor unit 240 receives a signal for movement of the object F to provide movement information to the electronic device 100, and further receives a signal for detecting proximity of the object F to provide proximity information to the electronic device 100. The sensor unit 240 may be controlled by a processor of the electronic device 100.

As shown in FIG. 4B, the light receiving device 244 of the sensor unit 240 includes eight channels, but is not limited thereto. For example, the light receiving device 244 may consist of a number of channels less than the eight channels or a number of channels greater than the eight channels.

Figure 5:
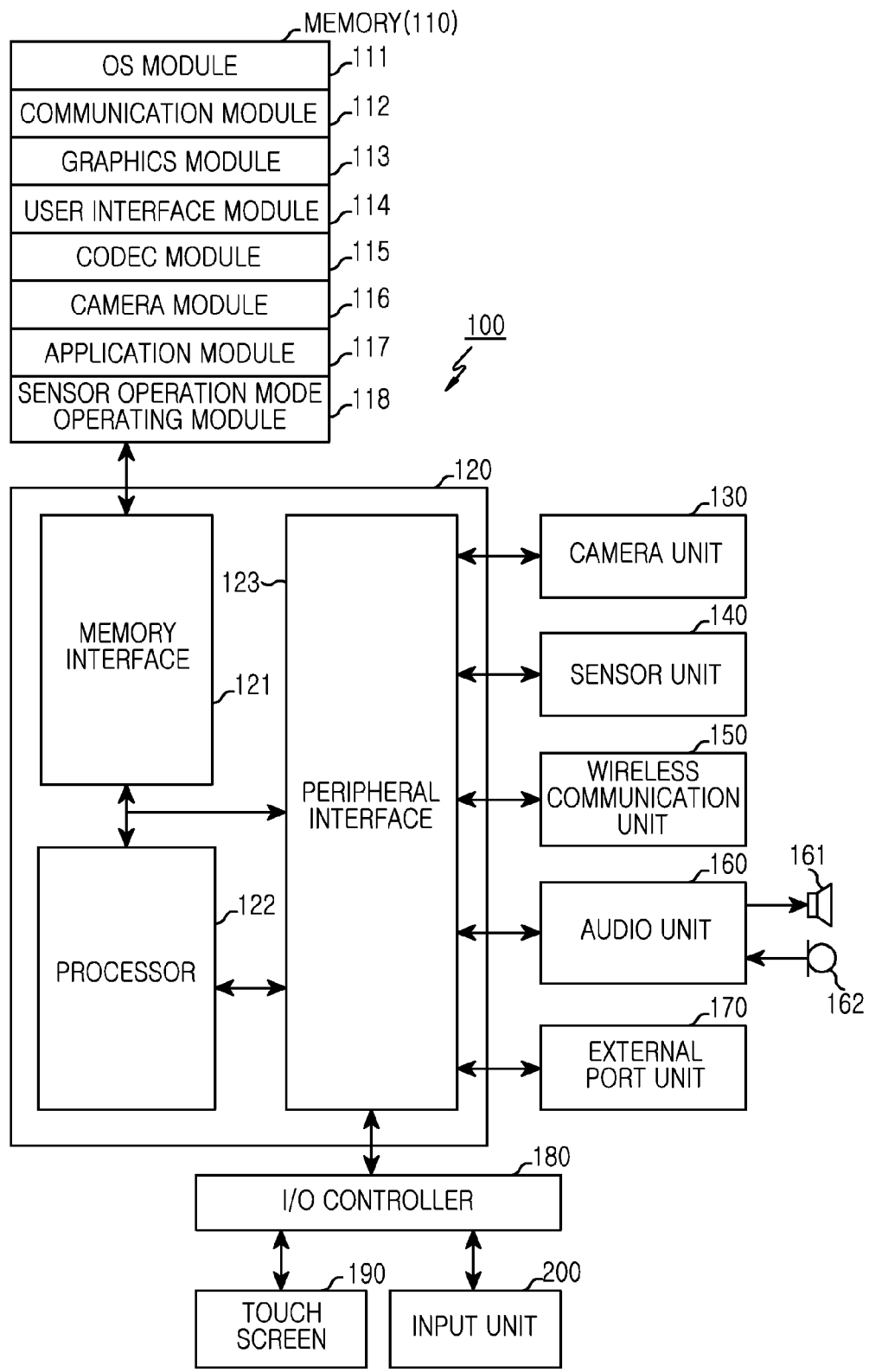
FIG. 5 is a block diagram illustrating an electronic device according to an embodiment of the present invention.

FIG. 5 is a block diagram illustrating an electronic device 100 according to an embodiment of the present invention.

Referring to FIG. 5, the electronic device 100 may be a device such as a PDA, a laptop computer, a mobile phone, a smartphone, a net book, a handheld computer, an MID, a media player, a UMPC, a tablet PC, a note PC, a wrist watch, a navigation device, an MP3 player, a camera unit, etc. Also, the electronic device 100 may be an arbitrary device including a device combining two or more functions among these devices.

The electronic device 100 includes a memory 110, a processor unit 120, a camera unit 130, a sensor unit 140, a wireless communication unit 150, an audio unit 160, an external port unit 170, an input/output (I/O) controller 180, a touchscreen 190, and an input unit 200. A plurality of memories 110 and external port units 170 may be provided.

Each element is described below

The processor unit 120 includes a memory interface 121, at least one processor 122, and a peripheral interface 123. Here, the memory interface 121, the at least one processor 122, and the peripheral interface 123 included in the processor unit 120 may be integrated in at least one integrated circuit or implemented as separate elements.

The memory interface 121 controls an access to the memory 110 by elements such as the processor 122 and the peripheral interface 123.

The peripheral interface 123 controls connections between I/O peripherals of the electronic device 100, and the processor 122 and the memory interface 123.

The processor 122 controls the overall operation of the electronic device 100 to provide various multimedia services using at least one software program. The processor 122 executes at least one program stored in the memory 110 to provide a service corresponding to a relevant program.

The processor 122 executes various software programs to perform various functions for the electronic device 100, and performs processes and controls for voice communication, video communication, and data communication. The processor 122 performs methods of embodiments of the present invention in cooperation with software modules stored in the memory 110.

The processor 122 controls the sensor unit 140 to set an operation mode of the sensor unit 140. The sensor unit 140 operates in one of the gesture mode, the proximity mode, and the simultaneous mode. Also, the processor 122 performs relevant functions corresponding to movement information and proximity information provided from the sensor unit 140.

The processor unit 122 may include one or more data processors, image processors, or CODECs. Furthermore, the electronic device 100 may configure the data processor, the image processor, or the CODEC, separately.

The camera unit 130 performs a camera function such as a photo, a video clip, recording, etc. The camera unit 130 may include a Charged Coupled Device (CCD) or a Complementary Metal Oxide Semiconductor (CMOS), etc. Also, the camera unit 130 may change hardware configuration, for example, lens movement, a number of an aperture, etc. depending on a camera program executed by the processor 122.

Various elements of the electronic device 100 may be connected via one or more communication buses or electric connection means.

The sensor unit 140 includes at least one light emitting device and at least one light receiving device, and detects movement and proximity of an object via an amount of light reflected by the object in the neighborhood of the sensor unit 140 using infrared rays. The sensor unit 140 operates in the proximity mode for detecting an object approaching the electronic device 100, and the gesture mode for detecting movement of an object separated from the sensor unit 140 by a predetermined distance. Also, the sensor unit 140 may operate in the simultaneous mode that activates the proximity mode and the gesture mode simultaneously. The sensor unit 140 is controlled by the processor 122 and provides movement information and proximity information obtained during the gesture mode, the proximity mode, and the simultaneous mode to the processor 122.

The wireless communication unit 150 enables wireless communication, and may include a Radio Frequency (RF) transmitter/receiver or a light (for example, infrared) transmitter/receiver. Though not shown, the wireless communication unit 150 may include an RF IC unit and a baseband processor. The RF IC unit transmits/receives a radio wave, and converts a baseband signal from the baseband processor to a radio wave to transmit the same via an antenna. The RF IC unit includes an RF transceiver, an amplifier, a tuner, an oscillator, a digital signal processor, a coding decoding (CODEC) chip set, a Subscriber Identity Module (SIM) card, etc.

The wireless communication unit 150 may be designed to operate via one of a GSM network, an EDGE network, a CDMA network, a W-CDMA network, an LTE network, an OFDMA network, a Wi-Fi network, a WiMax network, an NFC network, and an infrared communication network or a Bluetooth network depending on a communication network. However, it is not limited thereto, and the wireless communication unit 150 may apply various communication schemes that use a protocol for an e-mail, instant messaging, or a Short Message Service (SMS).

The audio unit 160 may be connected to a speaker 161 and a microphone 162 to perform voice recognition, voice duplication, digital recording, or audio input/output such as a communication function. The audio unit 160 provides an audio interface between a user and the electronic device 100, receives a data signal from the processor unit 120, converts the received data signal to an electric signal, and outputs the converted electric signal via the speaker 161.

The speaker 161 converts an electric signal to an audible frequency band and outputs the same, and may be disposed in the front side or the backside of the electronic device 100. The speaker 161 may include a flexible film speaker where at least one piezoelectric body has been attached to one vibration film.

The microphone 162 converts a sound wave transferred from a person or other sound sources to an electric signal. The audio unit 160 receives an electric signal from the microphone 162, converts the received electric signal to an audio data signal, and transmits the converted audio data signal to the processor unit 120. The audio unit 160 may include an earphone, an ear set, a headphone or a headset detachable from the electronic device 100.

The external port unit 170 may directly connect the electronic device 100 with a counterpart electronic device, or indirectly connect the electronic device 100 with a counterpart electronic device via a network (for example, the Internet, an intranet, a wireless LAN, etc.). The external port unit 170 may include a USB port or a FIREWIRE port, etc.

The I/O controller 180 provides an interface between I/O units such as the touchscreen 190 and the input unit 200, and the peripheral interface 123. The I/O controller 180 may include a touchscreen controller and another input controller.

The touchscreen 190 provides an I/O interface between the electronic device 100 and a user. The touchscreen 190 applies a touch detect technology, transfers a user's touch input to the processor unit 120, and shows visual information, text, graphics or video, etc. provided from the processor unit 120 to a user.

The touchscreen 190 displays state information of the electronic device 100, a character input by a user, and moving pictures and still pictures, etc. The touchscreen 190 displays information of an application driven by the processor 122.

The touchscreen 190 may apply an arbitrary multi-touch detect technology including not only capacitive, resistive, infrared, and surface acoustic wave technologies but also proximity sensor arrangement or other elements. The touchscreen 190 may be at least one of an Liquid Crystal Display (LCD), an Organic Light Emitting Diode (OLED) display, an Active Matrix Organic Light Emitting Diode (AMOLED) display, a Thin Film Transistor-LCD (TFT-LCD) display, a flexible display or a three dimensional (3D) display.

The touchscreen 190 recognizes a touch via change of a physical quantity (for example, capacitance, resistance, etc.) depending on a contact of a finger or a stylus, etc., and detects an operation of flicking, a touch and drag, a tap and hold, a multi-tap, etc. In addition, the touchscreen 190 may recognize a hovering input (also called a non-contact touch or proximity touch).

The input unit 200 provides input data generated by a user's selection to the processor 122 via the I/O controller 180. The input unit 200 may include a keypad including at least one hardware button, and a touchpad for detecting touch information, etc. The input unit 200 may include an up/down button for volume control. In addition, the input unit 200 may include at least one of a push button to which a relevant function has been given, a locker button, a locker switch, a thumb-wheel, a dial, a stick, and a pointer device such as a stylus.

The memory 110 may include a high speed random access memory such as one or more magnetic disk storages or a non-volatile memory, and one or more optical storages or flash memories (for example, NAND, NOR). The memory 110 stores software. The software may include an Operating System (OS) module 111, a communication module 112, a graphics module 113, a user interface module 114, a CODEC module 115, a camera module 116, an application module 117, and a sensor operation mode operating module 118. A terminology of a module may be expressed as a set of instructions, an instruction set or a program.

The OS module 111 may include WINDOWS, LINUX, Darwin, RTXC, UNIX, OS X, android or a built-in OS such as VxWorks, and may include various software elements for controlling a general system operation. Control of the general system operation may include memory control and management, storage hardware (device) control and management, power control and management, etc. The OS module 111 may perform a function for swift communication between various hardware (devices) and software elements (modules).

The communication module 112 enables communication with a counterpart electronic device such as a computer, a server, an electronic device, etc. via the wireless communication unit 150 or the external port unit 170.

The graphics module 113 includes various software elements for providing/displaying graphics to/on the touchscreen 190. The term "graphics" refers to text, a web page, an icon, a digital image, a video, an animation, etc.

The user interface module 114 includes various software elements related to a user interface. The user interface module 114 controls to display information of an application driven by the processor 122 on the touchscreen 190. Also, the user interface module 114 may include content regarding how a state of a user interface changes or under what condition the state of the user interface changes, etc.

The CODEC module 115 may include a software element related to encoding and decoding of a video file.

The camera module 116 includes a camera related software element enabling camera related processes and camera functions.

The application module 117 may include a software element regarding at least one application installed to the electronic device 100. The application module may include a browser, an e-mail, a phonebook, games, a short message service, a multimedia message service, a Social Network Service (SNS), an instant message, a morning call, an MP3 player, schedule management, a camera, word processing, keyboard emulation, a music player, an address book, a contact list, a widget, a Digital Right Management (DRM), voice recognition, voice duplication, a position determining function, or a position based service, etc.

The sensor operation mode operating module 118 includes a software element for setting an operation mode of the sensor unit 140. The sensor operation mode operating module 118 may include a process and various routines for allowing the sensor unit 140 to activate the gesture mode, the proximity mode, or the simultaneous mode. The sensor operation mode operating module 118 may include an instruction for controlling the light emitting device and the light receiving device of the sensor unit 140.

The processor unit 120 may further include an additional module (instructions) besides the above-described modules. Also, various functions of the electronic device 100 according to an embodiment of the present invention may include hardware including one or more processings or an Application Specific Integrated Circuit (ASIC), or software.

Though not shown, the electronic device 100 may include a power system for supplying power to various elements included in the electronic device 100. The power system may include power (alternating power or a battery), a power error detection circuit, a power converter, a power inverter, a charger or a power state display unit (a light emitting diode). In addition, the electronic device 100 may include a power management and control unit for performing generation, management, and distribution functions of power.

Figure 6:
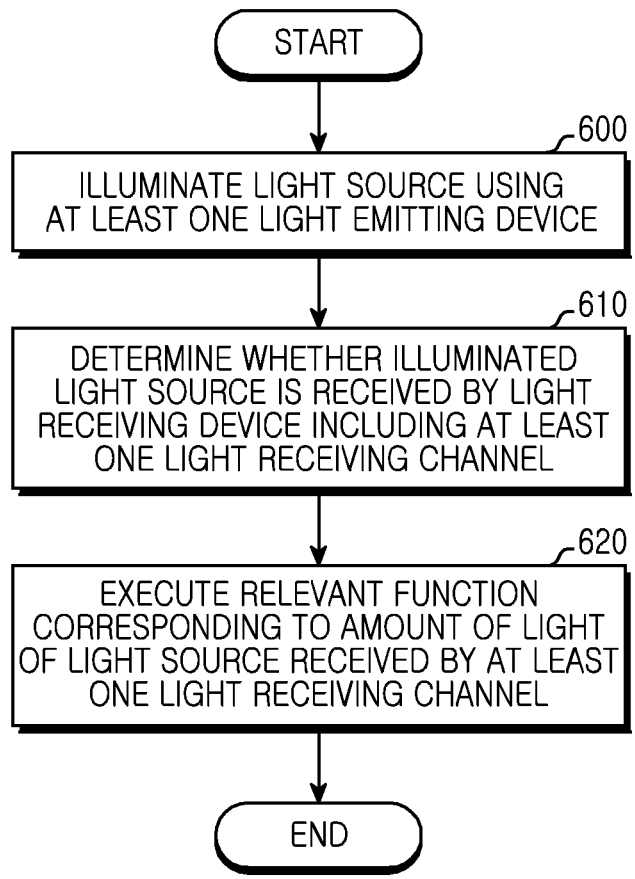
FIG. 6 is a flowchart illustrating an operating method of an electronic device according to an embodiment of the present invention.

FIG. 6 is a flowchart illustrating an operating method of an electronic device 100 according to an embodiment of the present invention.

Referring to FIG. 6, the electronic device 100 illuminates a light source using at least one light emitting device in step 600. According to an embodiment, the electronic device 100 is provided with the sensor unit 140 including at least one light emitting device and at least one light receiving device. The light emitting device generates infrared rays and emits a beam in the front direction. The light receiving device receives a light source reflected by an object among the infrared rays emitted from the light emitting device.

Next, the electronic device 100 determines whether the illuminated light source is received by a light receiving device including at least one light receiving channel in step 610. According to an embodiment, the light receiving device may include a plurality of light receiving channels for receiving a light source. The plurality of light receiving channels may be disposed at predetermined intervals or in a specific region. The electronic device 100 may allow the light receiving device to receive a light source using a portion of or all of the plurality of light receiving channels.

Next, the electronic device 100 executes a relevant function corresponding to an amount of light of the light source received by the at least one light receiving channel in step 620. According to an embodiment, the electronic device 100 controls the sensor unit 140 to operate in the gesture mode for detecting movement of an object separated from the electronic device 100 by a predetermined distance. When operating in the gesture mode, the sensor unit 140 receives a light source using a portion of or all of the at least one light receiving channel. The electronic device 100 may determine the up, down, left, and right movements of an object depending on an amount of a light source received by the plurality of light receiving channels.

According to another embodiment, the electronic device 100 controls the sensor unit 140 to operate in the proximity mode for detecting an object approaching the electronic device 100. When operating in the proximity mode, the sensor unit 140 receives a light source using a portion of or all of the at least one light receiving channel. The electronic device 100 determines proximity of an object depending on an amount of light of a light source received by a portion or all of the plurality of light receiving channels.

According to still another embodiment, the electronic device 100 controls the sensor unit 140 to operate in the simultaneous mode that activates the gesture mode and the proximity mode simultaneously. When the sensor unit 140 operates in the simultaneous mode, the electronic device 100 controls to receive a light source for detecting an object approaching the electronic device 100 using a light receiving channel located at a position separated the greatest distance from the light emitting device among at least one light receiving channel. Also, when the sensor unit 140 operates in the simultaneous mode to simultaneously detect movement of an object separated from the electronic device 100 by a predetermined distance and the object approaches the electronic device 100, the electronic device 100 may execute an application set in advance. That is, the electronic device 100 may obtain proximity information and movement information, etc. of an object to generate various events.

An instruction set for each process may be stored as one or more modules in the memory 110. In this case, the module stored in the memory 110 may be executed by one or more processors 122.

Figure 7:
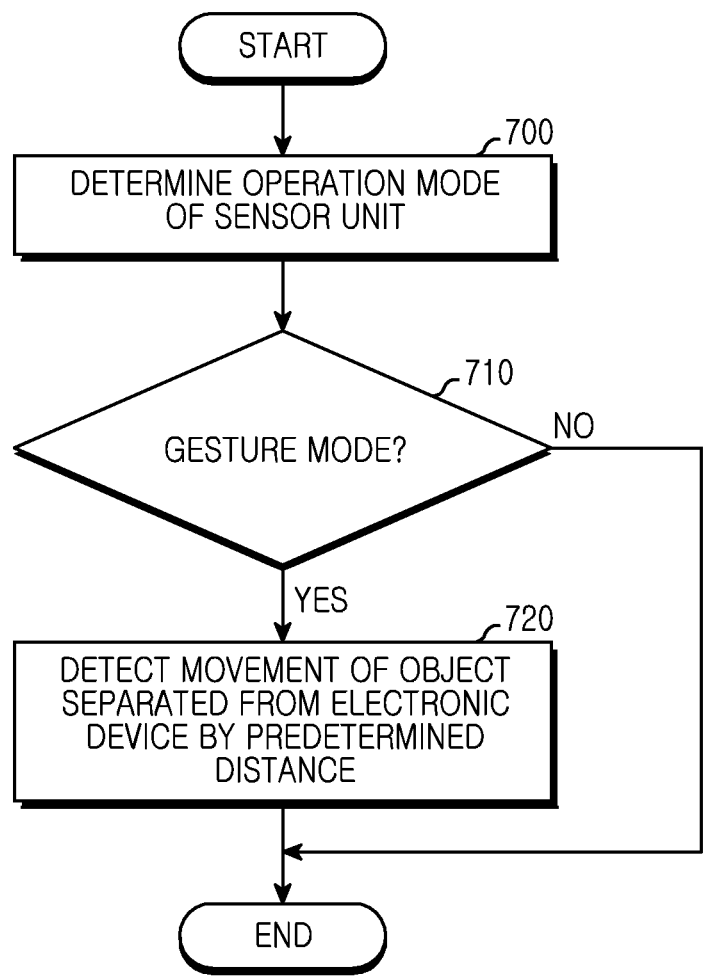
FIG. 7 is a flowchart illustrating an operating method of an electronic device according to another embodiment of the present invention.

FIG. 7 is a flowchart illustrating an operating method of an electronic device 100 according to another embodiment of the present invention.

Referring to FIG. 7, the electronic device 100 determines an operation mode of the sensor unit 140 in step 700. According to an embodiment, the sensor unit 140 may operate in the gesture mode for detecting movement of an object separated from the electronic device 100 by a predetermined distance, operate in the proximity mode for detecting an object approaching the electronic device 100, and operate in the simultaneous mode that activates the gesture mode and the proximity mode simultaneously. The operation mode of the sensor unit 140 may be determined by a user's setting, an instruction input, etc.

Next, the electronic device 100 determines whether the operation mode of the sensor unit 140 is the gesture mode in step 710. According to an embodiment, the electronic device 100 may set the operation mode of the sensor unit 140 to one of the gesture mode, the proximity mode, and the simultaneous mode.

When the operation mode of the sensor unit 140 is the gesture mode, the electronic device 100 detects movement of an object separated from the electronic device 100 by a predetermined distance in step 720. According to an embodiment, when the sensor unit 140 operates in the gesture mode, it receives a light source using a portion of or all of at least one light receiving channel. The electronic device 100 may determine the up, down, left, and right movement of an object depending on an amount of light of a light source received by a plurality of light receiving channels.

Figure 8:
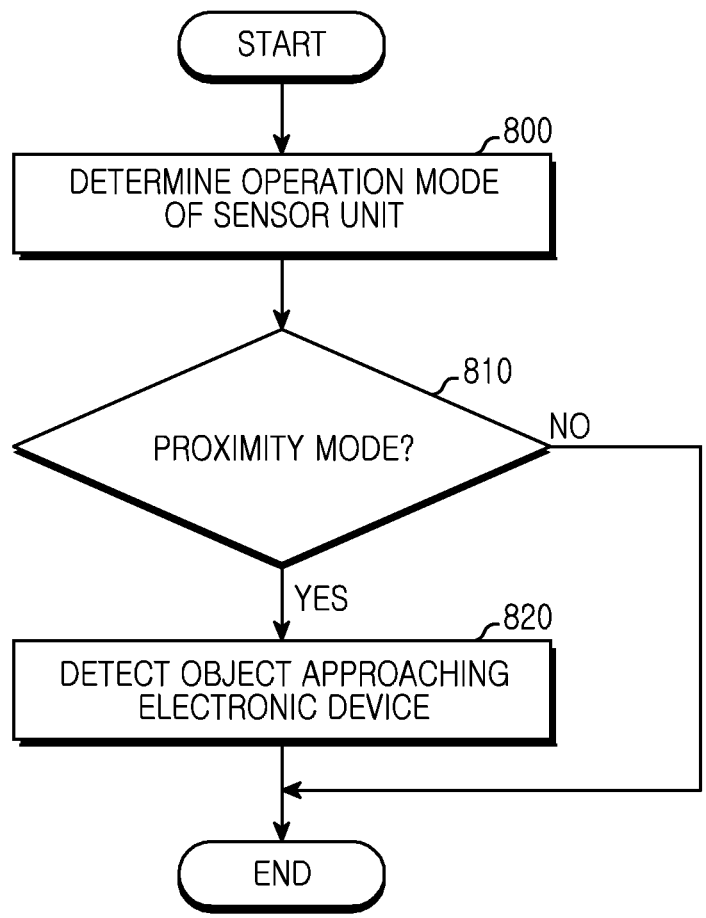
FIG. 8 is a flowchart illustrating an operating method of an electronic device according to still another embodiment of the present invention.

FIG. 8 is a flowchart illustrating an operating method of an electronic device 100 according to still another embodiment of the present invention.

Referring to FIG. 8, the electronic device 100 determines an operation mode of the sensor unit 140 in step 800. According to an embodiment, the sensor unit 140 may operate in the gesture mode for detecting movement of an object separated from the electronic device 100 by a predetermined distance, operate in the proximity mode for detecting an object approaching the electronic device 100, and operate in the simultaneous mode that activates the gesture mode and the proximity mode simultaneously. The operation mode of the sensor unit 140 may be determined by a user's setting, instruction input, etc.

Next, the electronic device 100 determines whether the operation mode of the sensor unit 140 is the proximity mode in step 810. According to an embodiment, the electronic device 100 may set the operation mode of the sensor unit 140 to one of the gesture mode, the proximity mode, and the simultaneous mode.

When the operation mode of the sensor unit 140 is the proximity mode, the electronic device 100 detects an object approaching the electronic device 100 in step 820. According to an embodiment, when the sensor unit 140 operates in the proximity mode, it receives a light source using a portion of or all of at least one light receiving channel. The electronic device 100 determines proximity of an object when an amount of light of a light source received by a portion of or all of a plurality of light receiving channels is greater than or equal to a reference value.

Figure 9:
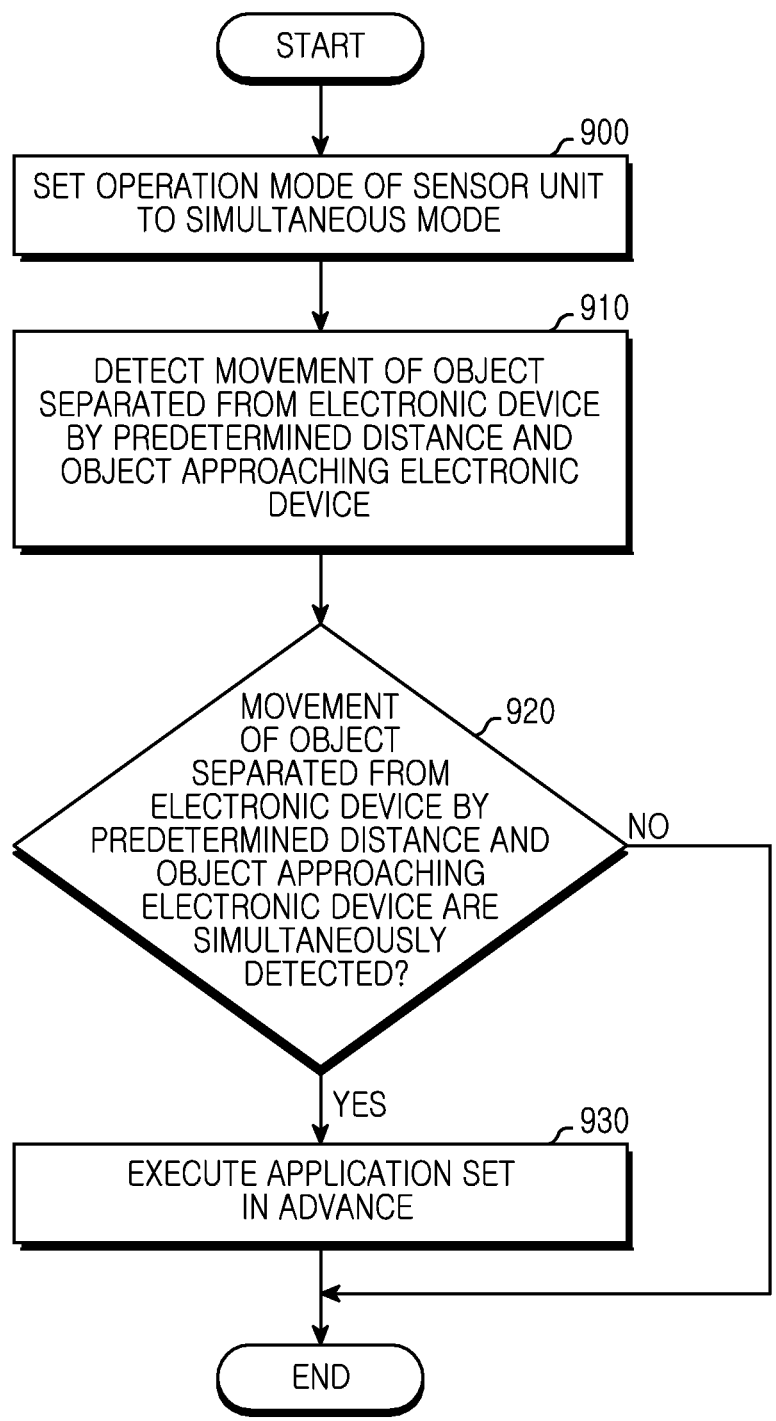
FIG. 9 is a flowchart illustrating an operating method of an electronic device according to various embodiments of the present invention.

FIG. 9 is a flowchart illustrating an operating method of an electronic device 100 according to various embodiments of the present invention.

Referring to FIG. 9, the electronic device 100 sets the operation mode of the sensor unit 140 to the simultaneous mode in step 900. According to an embodiment, the sensor unit 140 may operate in the gesture mode for detecting movement of an object separated from the electronic device 100 by a predetermined distance, operate in the proximity mode for detecting an object approaching the electronic device 100, and operate in the simultaneous mode that activates the gesture mode and the proximity mode simultaneously. The operation mode of the sensor unit 140 may be determined by a user's setting, instruction input, etc.

Next, the electronic device 100 detects movement of an object separated from the electronic device 100 by a predetermined distance and an object approaching the electronic device 100 in step 910. According to an embodiment, when the sensor unit 140 operates in the simultaneous mode, it receives a light source using a portion of or all of at least one light receiving channel. The electronic device 100 may determine the up, down, left, and right movement of an object depending on an amount of light of a light source received by a plurality of light receiving channels, and determines proximity of an object when the amount of light of the light source received by the plurality of light receiving channels is greater than or equal to a reference value. For example, the electronic device 100 controls to receive a light source for detecting an object approaching the electronic device 100 using a light receiving channel located at a position separated the greatest distance from the light emitting device among the at least one light receiving channels.

Next, the electronic device 100 determines whether it has detected movement of an object separated from the electronic device 100 by a predetermined distance and an object approaching the electronic device 100 simultaneously in step 920. According to an embodiment, the electronic device 100 simultaneously detects an object separated from the electronic device 100 by a predetermined distance as it recedes from the electronic device 100 and gets farther away while moving in a predetermined direction. Also, the electronic device 100 simultaneously detects an object separated from the electronic device 100 by a predetermined distance as it approaches the electronic device 100 and gets close while moving in a predetermined direction.

When simultaneously detecting movement of an object separated from the electronic device 100 by a predetermined distance and an object approaching the electronic device 100, the electronic device 100 executes an application set in advance in step 930. According to an embodiment, the electronic device 100 may set to execute a specific application among applications stored in the memory 110. The electronic device 100 may perform various functions besides an application set in advance.

According to an embodiment of the present invention, each of modules may be configured in software, firmware, hardware, or a combination thereof. All or a portion of a module may be configured in one entity and may perform the function of each module. Respective operations may be executed sequentially, repetitively, or in parallel. Some of operations may be omitted or other operations may be added and executed. For example, respective operations may be executed by a corresponding module described by the present invention.

Where implementation is in the form of software, a non-transient computer readable storage medium for storing one or more programs (software modules) may be provided. One or more programs stored in the computer readable storage medium are configured for execution by one or more processors inside the electronic device. One or more programs may include instructions for enabling the electronic device to execute the methods according to the various embodiments of the present invention.

The programs (a software module or software) may be stored in Random Access Memory (RAM), a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs), or other types of optical storage devices, and a magnetic cassette. Alternatively, the program may be stored in a memory configured by a portion or all of these. Also, a plurality of respective element memories may be provided.

The program may be stored in an attachable storage accessible to the electronic device via a communication network such as the Internet, an Intranet, a Local Area Network (LAN), Wide LAN (WLAN), or Storage Area Network (SAN), or a communication network configured in a combination of these. The storage may access the electronic device via an external port. Also, a separate storage on a communication network may access the portable electronic device.

Although the present invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined not only by the appended claims but also the equivalents thereof.

What is claimed is:

1. A method in an electronic device, the method comprising:
    illuminating a light source using at least one light emitting device;
    determining whether the illuminated light source is received by a light receiving device comprising a plurality of light receiving channels having at least two distances from the at least one light emitting device; and
    performing a relevant function corresponding to an amount of light of the light source received by at least one of the plurality of light receiving channels,
    wherein an area of the light receiving device is divided into the light receiving channels, and
    wherein performing the relevant function comprises:
    detecting a movement of an object using all of the light receiving channels; and
    detecting an approach of the object using one of the light receiving channels that is located a greatest distance from the at least one light emitting device.

2. The method of claim 1, wherein illuminating the light source using the at least one light emitting device is performed by reflection of light of the object.

3. The method of claim 1, wherein the relevant function is performed in a gesture mode for detecting movement of the object separated from the electronic device by a predetermined distance.

4. The method of claim 3, further comprising, when operating in the gesture mode, receiving the light source using a portion of or all of the light receiving channels.

5. The method of claim 1, wherein the relevant function is performed in a proximity mode for detecting the object approaching the electronic device.

6. The method of claim 5, further comprising, when operating in the proximity mode, receiving the light source using a portion of or all of the light receiving channels.

7. The method of claim 1, wherein the relevant function is performed in a simultaneous mode that simultaneously activates a gesture mode for detecting movement of the object separated from the electronic device by a predetermined distance and a proximity mode for detecting the approach of the object.

8. The method of claim 7, further comprising, when operating in the simultaneous mode and simultaneously detecting movement of the object separated from the electronic device by a predetermined distance and the object approaching the electronic device, executing an application set in advance.

9. An electronic device comprising:
    a light emitting device;
    a light receiving device disposed at a position adjacent to the light emitting device and comprising a plurality of light receiving channels having at least two distances from the light emitting device; and
    a processor configured to:
    determine an amount of a light source received by at least one of the light receiving channels depending on reflection of light of an object; and
    perform a relevant function corresponding to the determined amount of the light source,
    wherein an area of the light receiving device is divided into the light receiving channels, and
    wherein the processor is further configured to:
    detect a movement of the object using all of the light receiving channels; and
    detect an approach of the object using one of the light receiving channels that is located a greatest distance from the light emitting device.

10. The electronic device of claim 9, wherein the electronic device can operate in a gesture mode for detecting movement of the object separated from the electronic device by a predetermined distance.

11. The electronic device of claim 10, wherein when operating in the gesture mode, the reflection of light is received using a portion of or all of the light receiving channels.

12. The electronic device of claim 9, wherein the electronic device can operate in a proximity mode for detecting the object approaching the electronic device.

13. The electronic device of claim 12, wherein when operating in the proximity mode, the reflection of light is received using a portion of or all of the light receiving channels.

14. The electronic device of claim 9, wherein the electronic device can operate in a simultaneous mode that simultaneously activates a gesture mode for detecting movement of the object separated from the electronic device by a predetermined distance and a proximity mode for detecting the approach of the object.

15. The electronic device of claim 14, wherein, when operating in the simultaneous mode and simultaneously detecting movement of the object separated from the electronic device by a predetermined distance and the object approaching the electronic device, the processor executes an application set in advance.

16. A non-transient computer readable storage medium storing one or more programs comprising instructions, when executed by an electronic device, for performing a method in the electronic device, the method comprising:
    illuminating a light source using at least one light emitting device;
    determining whether the illuminated light source is received by a light receiving device comprising a plurality of light receiving channels having at least two distances from the at least one light emitting device; and
    performing a relevant function corresponding to an amount of light of the light source received by the at least one light receiving channel,
    wherein an area of the light receiving device is divided into the light receiving channels, and
    wherein performing the relevant function comprises:
    detecting a movement of an object using all of the light receiving channels; and
    detecting an approach of the object using one of the light receiving channels that is located a greatest distance from the at least one light emitting device.

* * * * *